United States Patent
Yasuda et al.

(10) Patent No.: US 8,476,379 B2
(45) Date of Patent: Jul. 2, 2013

(54) SILPHENYLENE SKELETON-CONTAINING SILICONE TYPE POLYMER AND METHOD FOR MANUFACTURING THE SAME

(75) Inventors: Hiroyuki Yasuda, Annaka (JP); Takato Sakurai, Annaka (JP); Takanobu Takeda, Annaka (JP); Hideto Kato, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 232 days.

(21) Appl. No.: 13/095,237

(22) Filed: Apr. 27, 2011

(65) Prior Publication Data

US 2011/0275768 A1   Nov. 10, 2011

(30) Foreign Application Priority Data

May 7, 2010   (JP) .................. 2010-107600

(51) Int. Cl.
   *C08F 283/12*   (2006.01)
   *C08G 67/02*   (2006.01)
(52) U.S. Cl.
   USPC ............ 525/474; 525/476; 525/479; 528/392
(58) Field of Classification Search
   USPC .................. 525/479, 474; 528/392
   See application file for complete search history.

(56) References Cited

U.S. PATENT DOCUMENTS

| | | | |
|---|---|---|---|
| 3,159,601 A | 12/1964 | Ashby | |
| 3,159,662 A | 12/1964 | Ashby | |
| 3,220,972 A | 11/1965 | Lamoreaux | |
| 3,775,452 A | 11/1973 | Karstedt | |
| 8,378,148 B2 * | 2/2013 | Sakurai et al. | 568/640 |
| 2004/0082819 A1 | 4/2004 | Mori et al. | |
| 2008/0182087 A1 * | 7/2008 | Kato et al. | 428/195.1 |

FOREIGN PATENT DOCUMENTS

| | | |
|---|---|---|
| EP | 2 316 810 A1 | 5/2011 |
| JP | A-4-166945 | 6/1992 |
| JP | A-2004-224856 | 8/2004 |
| JP | A-2005-208679 | 8/2005 |
| JP | A-2008-184571 | 8/2008 |

OTHER PUBLICATIONS

European Search Report dated Feb. 21, 2012 issued in European Patent Application No. 11003559.9.

* cited by examiner

*Primary Examiner* — Randy Gulakowski
*Assistant Examiner* — Christopher M Rodd
(74) *Attorney, Agent, or Firm* — Oliff & Berridge, PLC

(57) ABSTRACT

There is disclosed a silphenylene skeleton-containing silicone type polymer comprising a repeating unit represented by the following general formula (1) and having a weight average molecular weight of 5,000 to 40,000. There can be a novel silphenylene skeleton-containing silicone type polymer which enables to satisfy both chemical resistance and adhesiveness to a substrate and can be used as a material for a thermosetting resin for forming coatings for protecting substrates, circuits, and interconnections; and a method for manufacturing the same.

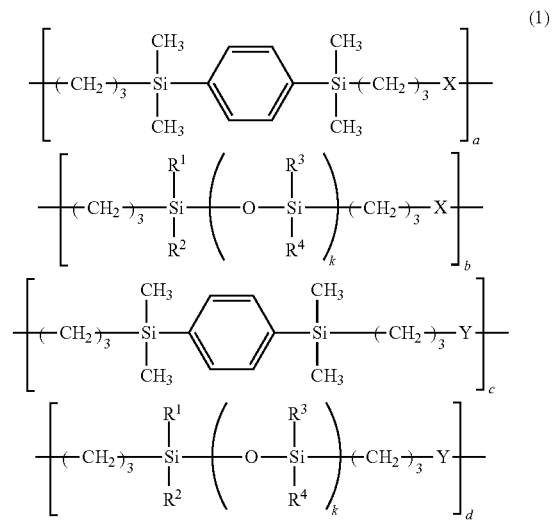

(1)

12 Claims, No Drawings

SILPHENYLENE SKELETON-CONTAINING SILICONE TYPE POLYMER AND METHOD FOR MANUFACTURING THE SAME

BACKGROUND OF THE INVENTION

1. Field of the Invention

The present invention relates to a novel silphenylene skeleton-containing silicone type polymer having a carboxyl group and being applicable to, for example, coatings for protecting substrates, circuits, and interconnections; and a method for manufacturing the same.

2. Description of the Related Art

Since silicone type polymers are excellent especially in flexibility, they have been used as a fundamental material for a protective coating film, an insulating coating film, strippable paint and the like. For example, a silicone type polymer having an alcoholic hydroxyl group (Japanese Patent Laid-Open (kokai) No. 2004-224856) and a silphenylene skeleton-containing silicone type polymer in which chemical resistance and adhesiveness to a substrate are further improved (Japanese Patent Laid-Open (kokai) No. 2008-184571) have been proposed.

SUMMARY OF THE INVENTION

However, a resin in which a carboxyl group is introduced to such a silicon type polymer as described above has not been known.

The present invention was made in view of the situation as mentioned above and has an object to provide a novel silphenylene skeleton-containing silicone type polymer in which a carboxyl group is introduced by substitution and which can be applied, for example, as coatings for protecting substrates, circuits, and interconnections; and a method for manufacturing the same.

In order to achieve the object as mentioned above, the present invention provides a silphenylene skeleton-containing silicone type polymer comprising a repeating unit represented by the following general formula (1) and having a weight average molecular weight of 5,000 to 40,000,

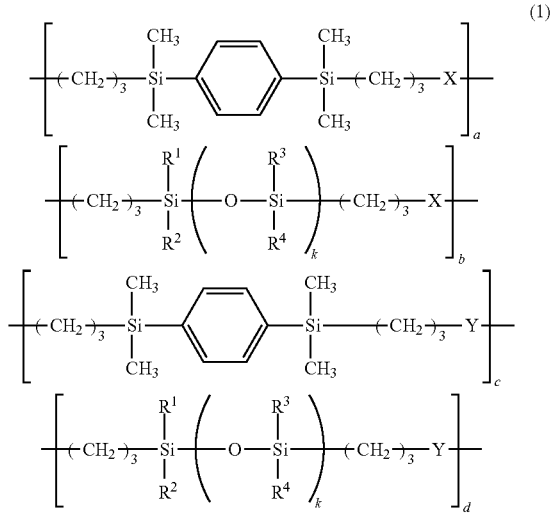

wherein $R^1$ to $R^4$ are each a monovalent hydrocarbon group having 1 to 12 carbon atoms and may be the same or different from each other; k is an integer of 1 to 100; a and b are each 0 or a positive number, and c and d are each a positive number, and they satisfy $0<(c+d)/(a+b+c+d)\leq 1.0$; X is a divalent organic group represented by the following general formula (2); and Y is a divalent organic group represented by the following general formula (3),

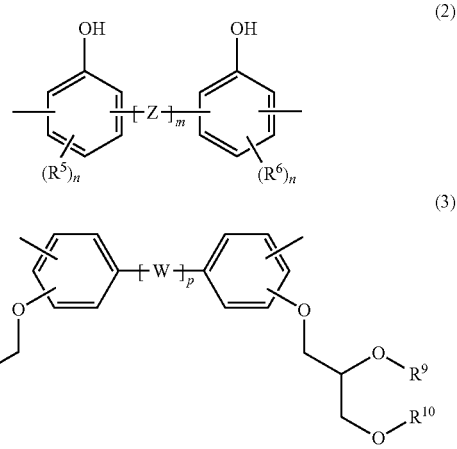

wherein Z and W are each a divalent organic group selected from groups represented by the following formulae;

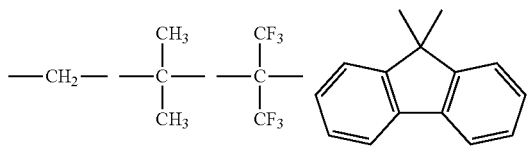

m and p are each 0 or 1; n is 0, 1 or 2; $R^5$ and $R^6$ are each an alkyl or alkoxyl group having 1 to 4 carbon atoms and may be the same or different from each other; and $R^7$ to $R^{10}$ are each a hydrogen atom or a carboxyl-containing organic group and may be the same or different from each other, wherein at least part of $R^7$ to $R^{10}$ is a carboxyl-containing organic group.

Such a silphenylene skeleton-containing silicone type polymer enables to satisfy both chemical resistance and adhesiveness to a substrate when used as, for example, a composition for a thermosetting resin.

In such a silphenylene skeleton-containing silicone type polymer, a content ratio of the carboxyl-containing organic group of $R^7$ to $R^{10}$ of the foregoing general formula (3) is preferably 50% to 100% and a weight average molecular weight is preferably 10,000 to 30,000.

The content ratio of the carboxyl-containing organic group of $R^7$ to $R^{10}$ of the foregoing general formula (3) of 50% to 100% and the weight average molecular weight of 10,000 to 30,000 as described above enable sufficient curing to provide a cured film having high moisture resistance.

Further, at least part of $R^7$ to $R^{10}$ of the foregoing general formula (3) is preferably a group represented by the following formula.

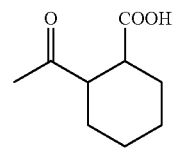

Such a silphenylene skeleton-containing silicone type polymer in which at least part of $R^7$ to $R^{10}$ of the foregoing general formula (3) is a group represented by the above formula as described can be manufactured easily.

Further, the present invention provides a method for manufacturing the silphenylene skeleton-containing silicone type polymer comprising at least steps of:

preparing a silphenylene skeleton-containing silicone type polymer having an alcoholic hydroxyl group in which $R^7$ to $R^{10}$ of the foregoing general formula (3) are each a hydrogen atom through a polymerization reaction, in the presence of a catalyst, of hydrogensilphenylene represented by the following general formula (4),

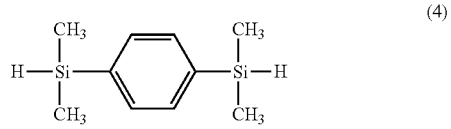

(4)

dihydroorganosiloxane represented by the following general formula (5),

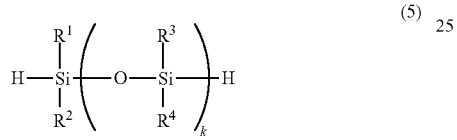

(5)

wherein $R^1$ to $R^4$ and k are the same as above,
a diallylphenol compound represented by the following general formula (6),

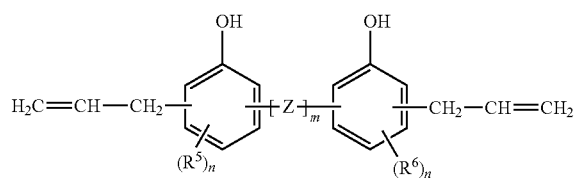

(6)

wherein $R^5$, $R^6$, Z, m and n are the same as above, and a diallylphenol compound represented by the following general formula (7),

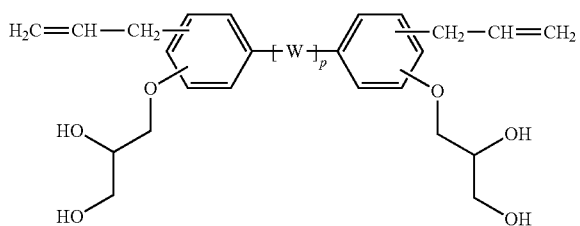

(7)

wherein W and p are the same as above; and
substituting at least part of hydrogen atoms of an alcoholic hydroxyl group of the prepared polymer with a carboxyl-containing organic group.

As the substituting step, at least part of hydrogen atoms of an alcoholic hydroxyl group of the prepared polymer can be substituted with 2-carboxycyclohexylcarbonyl group through a reaction of the prepared polymer with hexahydrophthalic anhydride, for example.

Such a manufacturing method enables to manufacture the silphenylene skeleton-containing silicone type polymer of the present invention, which is useful as compositions for thermosetting resins applied to, for example, coatings for protecting substrates and circuits, with high yield.

As explained above, the novel silphenylene skeleton-containing silicone type polymer of the present invention is useful as compositions for thermosetting resins applicable to, for example, coatings for protecting substrates, circuits, and interconnections. In addition, the manufacturing method of the present invention enables to manufacture the silphenylene skeleton-containing polymer having a carboxyl group with high yield.

DETAILED DESCRIPTION OF THE PREFERRED EMBODIMENTS

The present invention will be explained hereinafter in detail.

As described above, a silphenylene skeleton-containing silicone type polymer to which a carboxyl group is introduced by substitution has not been synthesized as a composition for thermosetting resins having both chemical resistance and adhesiveness to a substrate sufficiently, and such a polymer has been required to be developed.

Inventors of the present invention carried out an extensive investigation to accomplish the purpose.

As a result, they found that by using a polymer containing a silphenylene skeleton and containing a repeating unit having a carboxyl group as a main component of a composition for a thermosetting resin, chemical resistance and adhesiveness to a substrate can be obtained sufficiently and simultaneously, thereby succeeded in accomplishing the present invention.

Although embodiments of the present invention will be explained hereinafter more specifically, the present invention is not limited thereto.

The novel silphenylene skeleton-containing silicone type polymer of the present invention is a polymer comprising a repeating unit represented by the following general formula (1) and having a weight average molecular weight of 5,000 to 40,000.

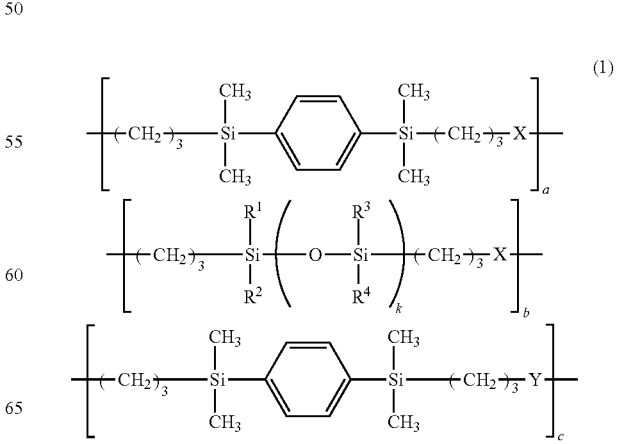

(1)

-continued

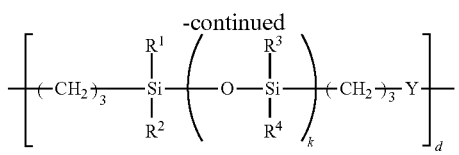

In the foregoing general formula (1), $R^1$ to $R^4$ are each a monovalent hydrocarbon group having 1 to 12 carbon atoms and preferably 1 to 6 carbon atoms and may be the same or different from each other.

Examples of $R^1$ to $R^4$ include a linear, branched, or cyclic alkyl group such as a methyl group, an ethyl group, a propyl group, an isopropyl group, a n-butyl group, a tert-butyl group and a cyclohexyl group; a linear, branched, or cyclic alkenyl group such as a vinyl group, an allyl group, a propenyl group, a butenyl group, a hexenyl group and a cyclohexenyl group; an aryl group such as a phenyl group and a tolyl group; and an aralkyl group such as a benzyl group and a phenylethyl group.

Further, k is an integer of 1 to 100 and preferably an integer of 1 to 40. If k is more than 100, there is a possibility that a sufficient reaction for the synthesis of the polymer of the present invention does not proceed because of deterioration of compatibility with an aromatic group represented by the following general formulae (2) and (3).

a and b are each 0 or a positive number, and c and d are each a positive number, and they satisfy $0<(c+d)/(a+b+c+d)\leq1.0$, preferably $0.3\leq(c+d)/(a+b+c+d)\leq0.6$ and more preferably $0.4\leq(c+d)/(a+b+c+d)\leq0.5$.

Here, it is essential that they satisfy $0<(c+d)/(a+b+c+d)\leq1.0$ in order to add thermosetting property to a resin to be obtained subsequently.

Further, X is a divalent aromatic group having a hydrophilic group (a phenolic hydroxyl group) represented by the following general formula (2); and Y is a divalent aromatic group having a carboxyl group represented by the following general formula (3),

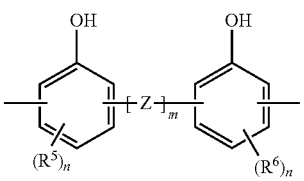

(2)

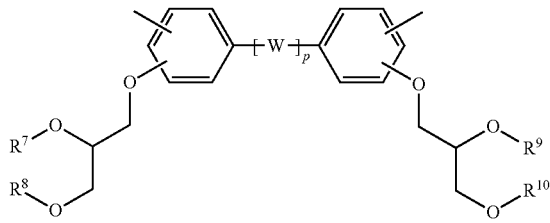

(3)

wherein Z and W are each a divalent organic group selected from groups represented by the following formulae;

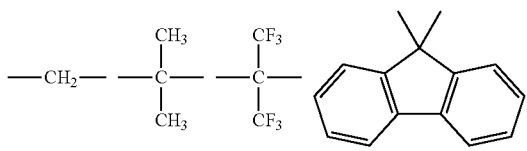

m and p are each 0 or 1; n is 0, 1 or 2; $R^5$ and $R^6$ are each an alkyl or alkoxyl group having 1 to 4 carbon atoms and may be the same or different from each other; and $R^7$ to $R^{10}$ are each a hydrogen atom or a carboxyl-containing organic group and may be the same or different from each other, wherein at least part of $R^7$ to $R^{10}$ is a carboxyl-containing organic group.

Preferable examples of $R^5$ and $R^6$ include a methyl group, an ethyl group, an isopropyl group, a tert-butyl group, a methoxy group, an ethoxy group, an isopropyloxy group, and the like.

$R^7$, $R^8$, $R^9$ and $R^{10}$ are each a hydrogen atom or a carboxyl-containing organic group and may be the same or different from each other, wherein at least part of $R^7$ to $R^{10}$ is a carboxyl-containing organic group.

Preferable examples of the carboxyl-containing organic group include a monovalent organic group shown below.

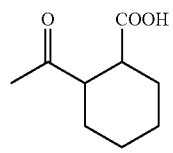

A weight average molecular weight of the silphenylene skeleton-containing silicone type polymer of present invention comprising a repeating unit represented by the foregoing general formula (1) is 5,000 to 40,000 and preferably 15,000 to 25,000.

Here, the weight average molecular weight is a value in terms of polystyrene measured by a gel permeation chromatography (GPC).

At least part of $R^7$ to $R^{10}$ is a monovalent carboxyl-containing organic group, while a content ratio of the group is preferably 50% to 100%, more preferably 60% to 80% and further preferably 70% to 80% and a weight average molecular weight of the polymer is preferably 10,000 to 30,000.

When the content ratio of the carboxyl-containing organic group is 50% or more as mentioned above, thermosetting property of a composition for a resin is significantly enhanced.

In addition, in the case of formulating this silphenylene skeleton-containing silicone type polymer having a carboxyl-containing organic group, a weight average molecular weight of 10,000 or more surely enables sufficient curing and a weight average molecular weight of 30,000 or less enables to avoid a possibility of decreasing moisture resistance of the cured film.

Furthermore, in the case that the monovalent carboxyl-containing organic group is 2-carboxycyclohexylcarbonyl group, a weight average molecular weight of the polymer comprising a repeating unit represented by the foregoing general formula (1) is preferably 10,000 to 30,000 and more preferably 20,000 to 30,000.

Such a silphenylene skeleton-containing silicone type polymer of the present invention can be manufactured at least by steps of: preparing a silphenylene skeleton-containing silicone type polymer having an alcoholic hydroxyl group in which $R^7$ to $R^{10}$ of the foregoing general formula (3) are each a hydrogen atom; and substituting at least part of hydrogen atoms of an alcoholic hydroxyl group of the prepared polymer with a carboxyl-containing organic group.

The silphenylene skeleton-containing silicone type polymer in which $R^7$ to $R^{10}$ are each a hydrogen atom can be prepared through a so-called "hydrosilylation" polymerization reaction, in the presence of a catalyst, of hydrogensilphenylene represented by the following general formula (4) (i.e., 1,4-bis(dimethylsilyl)benzene),

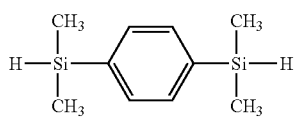

(4)

dihydroorganosiloxane represented by the following general formula (5),

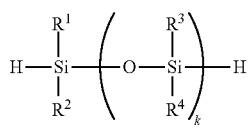

(5)

wherein R¹ to R⁴ and k are the same as above,
a diallylphenol compound represented by the following general formula (6),

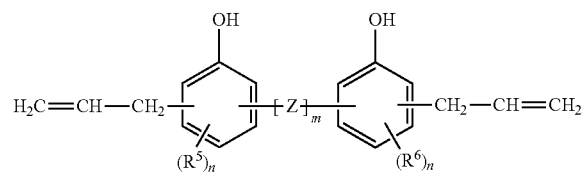

(6)

wherein Z, R⁵, R⁶, m and n are the same as above, and a diallylphenol compound represented by the following general formula (7),

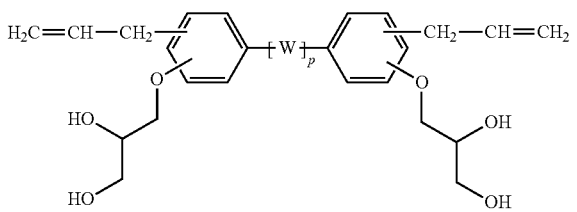

(7)

wherein W and p are the same as above.

Here, the weight average molecular weight of the polymer of the present invention containing an alcoholic hydroxyl group and comprising a repeating unit represented by the foregoing general formula (1) can be easily controlled by adjusting a ratio of the total number of allyl groups in the diallylphenol compound represented by the foregoing general formulae (6) and (7) to the total number of hydrosilyl groups in hydrogensilphenylene represented by the foregoing general formula (4) and dihydroorganosiloxane represented by the foregoing general formula (5) (i.e., total number of allyl groups/total number of hydrosilyl groups). Alternatively, a polymer having the desired molecular weight may be produced by polymerization of the diallylphenol compounds with hydrogensilphenylene and dihydroorganosiloxane with using a monoallyl compound such as o-allylphenol, a monohydrosilane such as triethylhydrosilane or monohydrosiloxane as a molecular weight modifier.

Examples of the catalysts which can be used in the polymerization reaction described above include a platinum group metal element such as platinum (inclusive of platinum black), rhodium and palladium; a platinum chloride, a chloroplatinic acid and a chloroplatinate such as $H_2PtCl_4 \cdot xH_2O$, $H_2PtCl_6 \cdot xH_2O$, $NaHPtCl_6 \cdot xH_2O$, $KHPtCl_6 \cdot xH_2O$, $Na_2PtCl_6 \cdot xH_2O$, $K_2PtCl_4 \cdot xH_2O$, $PtCl_4 \cdot xH_2O$, $PtCl_2$, $Na_2HPtCl_4 \cdot xH_2O$ (in the formulae, x is preferably an integer of 0 to 6, more preferably 0 or 6); an alcohol-modified chloroplatinic acid as described in U.S. Pat. No. 3,220,972; complexes of a chloroplatinic acid with an olefin as described in U.S. Pat. No. 3,159,601, U.S. Pat. No. 3,159,662 and U.S. Pat. No. 3,775,452; a platinum group metal such as platinum black and palladium on supports such as alumina, silica and carbon; a rhodium-olefin complex; chlorotris(triphenylphosphine)rhodium, known as Wilkinson catalyst; and a complex of a platinum chloride, a chloroplatinic acid or a chloroplatinate with a vinyl-containing siloxane (specifically, a vinyl-containing cyclic siloxane).

In the polymerization reaction described above, a solvent may be used as appropriate. Suitable examples of the solvent include a hydrocarbon solvent such as toluene and xylene. An amount of the solvent to be used is not particularly limited, and is usually preferably 20 to 40 wt % and especially preferably 30 to 35 wt % relative to the total weight of the phenol compound represented by the foregoing formulae (6) and (7), hydrogensilphenylene represented by the foregoing general formula (4) and dihydroorganosiloxane represented by the foregoing general formula (5). When the amount of the solvent is in this range, there is no possibility that too long a time may be necessary until the completion of polymerization because of extremely low weight concentration or that a dispersity of the polymer to be obtained increases because of extremely high weight concentration, for example.

As a condition of the polymerization reaction, the polymerization temperature is preferably 40° C. to 150° C., and more preferably 60° C. to 120° C. The polymerization temperature of 40° C. or more enables to complete the polymerization rapidly and the polymerization temperature of 150° C. or less enables to avoid a possibility of deactivation of the catalyst.

The polymerization time may vary with a type and an amount of a desired polymer. In order to prevent moisture entry into the polymerization system, the polymerization is preferably completed within about 0.5 to 100 hours, and more preferably about 0.5 to 30 hours. After the polymerization is completed in such a manner, the solvent, if any, is removed. In this way, the alcoholic hydroxyl-containing polymer comprising a repeating unit represented by the foregoing general formula (1) of the present invention can be obtained.

Through a reaction of the silphenylene skeleton-containing silicone type polymer, in which $R^7$ to $R^{10}$ of the foregoing general formula (3) are each a hydrogen atom and which is synthesized by such a polymerization reaction as described above, with, for example, hexahydrophthalic anhydride in the presence of a base catalyst, a polymer in which at least part of $R^7$ to $R^{10}$ is substituted by a 2-carboxycyclohexylcarbonyl group can be manufactured. An amount of hexahydrophthalic anhydride to be added is preferably 0.95 to 1.10 mole % and especially preferably 0.98 to 1.05 mole % relative to an amount of an alcoholic hydroxyl group in the synthesized polymer.

The reaction described above proceeds by activating hexahydrophthalic anhydride by the aid of the base catalyst to open the ring. Examples of the base catalyst include an amine such as pyridine, N,N-dimethyl-4-amino pyridine, and preferable is N,N-dimethyl-4-amino pyridine. An amount of the catalyst is preferably 0.01 to 0.05 mole %, more preferably 0.02 to 0.03 mole % and especially preferably 0.025 to 0.03 mole % relative to an alcoholic hydroxyl group in the synthesized polymer. When the amount is 0.01 mole % or more, there is no possibility that the reaction rate decreases, and when the amount is 0.05 mole % or less, the reaction can be promoted efficiently without increasing a manufacturing cost.

Additionally, in order to prevent a generated carboxyl group from forming a salt with the base catalyst, another amine is preferably added as a subsidiary base. As such an amine, a tertiary amine is preferable and triethylamine is especially preferable. An amount of the subsidiary base to be used is preferably 2.0 to 3.0 mole %, more preferably 2.2 to 2.8 mole % and especially preferably 2.4 to 2.5 mole % relative to an alcoholic hydroxyl group in the synthesized polymer. When the amount is 2.0 mole % or more, there is no possibility of deactivating the base catalyst, and when the amount is 3.0 mole % or less, neutralizing in a subsequent treatment can be carried out with a small amount of acid.

In view of improvement of addition percentage and reaction rate, it is desirable to activate hexahydrophthalic anhydride by these bases.

In the reaction described above, a solvent may be used as appropriate. In order to carry out the reaction of a secondary alcoholic hydroxyl group of the foregoing general formula (3) with hexahydrophthalic anhydride, an ether-based solvent is preferable and tetrahydrofuran is especially preferable as the solvent. An amount of the solvent to be used in the present invention is not particularly limited, but is usually 10 to 50 wt %, preferably 15 to 40 wt % and more preferably 20 to 30 wt % relative to the alcoholic hydroxyl-containing polymer.

As a condition of the reaction described above, the reaction temperature is preferably 40° C. to 60° C., for example, and is especially preferably 50° C. to 55° C. When the reaction temperature is 40° C. or more, the reaction can be completed rapidly, and when the reaction temperature is 60° C. or less, there is no possibility that a 2-carboxycyclohexylcarbonyl group with which $R^7$ to $R^{10}$ are substituted further causes a side reaction with hexahydrophthalic anhydride.

The reaction time may vary with a type and an amount of a desired polymer, and it is preferably within about 1 to 50 hours and especially preferably 1 to 30 hours so as not to deactivate the base catalyst. After the reaction under such a condition, the base catalyst needs to be removed by an organic acid. Acetic acid is especially preferably used as the organic acid. Additionally, in the case of using a solvent, the polymer of the present invention, which has a repeating unit represented by the foregoing general formula (1) and contains a carboxyl group, can be obtained by removing the solvent.

The thus obtained silphenylene skeleton-containing silicone type polymer containing a carboxyl group of the present invention is useful as a silicone resin which can be used as coatings for protecting substrates, circuits, and interconnections.

EXAMPLES

Hereinafter, the present invention will be explained further in detail by Synthesis Examples and Referential Examples, but the present invention is not limited thereto.

Synthesis Example 1-1

Poured into a flask equipped with a stirrer, a thermometer, a nitrogen purging line and a reflux condenser were 349.9 g of 9,9'-bis[(3-allyl-4-hydroxyphenyl)fluorene], 248.1 g of 2,2-bis[2-allyl-4-(2,3-dihydroxypropoxy)phenyl]propane, 1494.7 g of toluene and 2.81 g of platinum catalyst supported on a carrier of carbon (5 wt %), and the mixture was heated at 60° C. Then, 190.9 g of organohydrogensiloxane represented by the following average structural formula was dropped in the flask for one hour. After the dropping was finished, the reaction solution was aged for 3 hours at 90° C. Subsequently, 210.7 g of 1,4-bis(dimethylsilyl)benzene was dropped in the flask for one hour. After the dropping was finished, the reaction solution was further aged for 4 hours at 90° C. and filtered, and then, 800 g of methyl isobutyl ketone and 1500 g of water were added into them. The mixture was separated into layers and the water layer of the under layer was removed. The solvent in the thus obtained solution was removed under reduced pressure, to obtain a resin solid (A-1) shown below. A weight average molecular weight, in terms of polystyrene, of a solution in which the resin solid is dissolved into tetrahydrofuran was 18,000 by measurement of GPC. (A-1) corresponds to the foregoing general formula (1) wherein (c+d)/(a+b+c+d)=0.40.

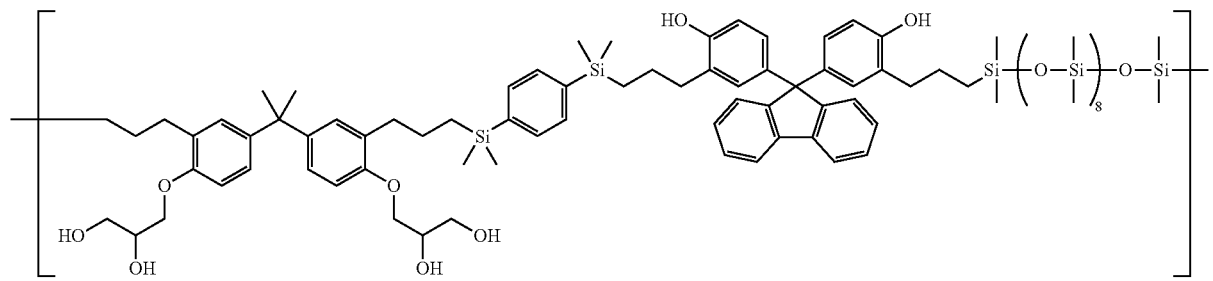

(A-1)

Synthesis Example 1-2

120.8 g of the resin solid (A-1) synthesized in Synthesis Example 1-1 was dissolved into 1200 g of tetrahydrofuran, and the solution was poured into a flask equipped with a stirrer, a thermometer, a nitrogen purging line and a reflux condenser. Then, 40.1 g of hexahydrophthalic anhydride, 65.9 g of triethylamine and 0.8 g of N,N-dimethyl-4-amino pyridine were added thereinto, and the mixture was stirred for 10 minutes at room temperature to dissolve them completely. Subsequently, the mixture solution was stirred for 32 hours at 55° C., tetrahydrofuran therein was removed, and then, 400 g of methyl isobutyl ketone and 500 g of water were added to carry out neutralizing washing. Thereafter, the water layer after separation was removed, a solvent in the thus obtained solution was removed under reduced pressure and 150 g of cyclopentanone was added, to obtain a resin solution (A-2) shown below, which has a resin solids concentration of 50% and contains cyclopentanone as a main solvent. A weight average molecular weight, in terms of polystyrene, of the resin solution was 23,000 by measurement of GPC.

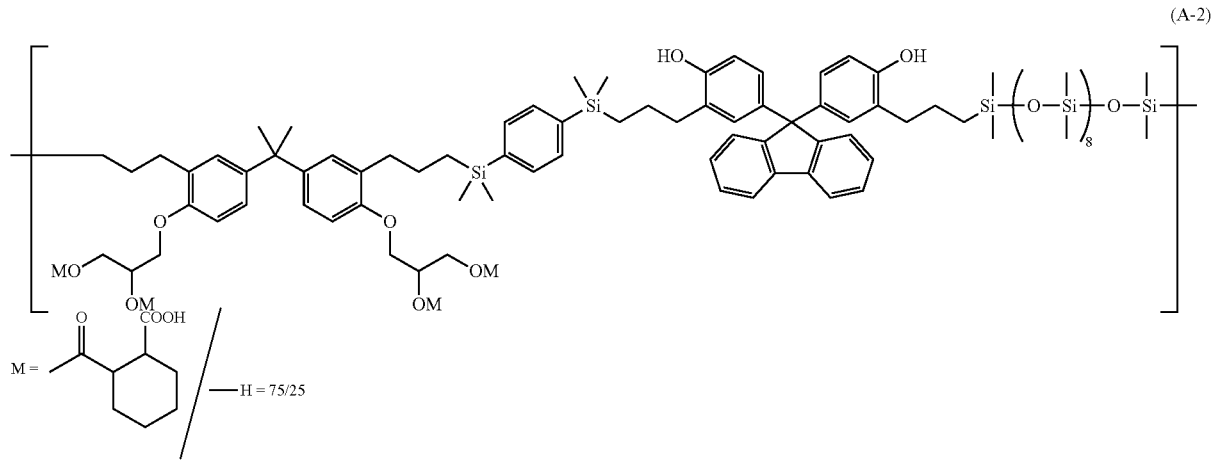

(A-2)

Synthesis Example 2-1

Poured into a flask equipped with a stirrer, a thermometer, a nitrogen purging line and a reflux condenser were 30.8 g of 9,9'-bis[(3-allyl-4-hydroxyphenyl)fluorene], 12.4 g of 2,2-bis[2-allyl-4-(2,3-dihydroxypropoxy)phenyl]propane, 346.9 g of toluene and 0.19 g of platinum catalyst supported on a carrier of carbon (5 wt %), and the mixture was heated at 60° C. Then, 92.8 g of organohydrogensiloxane represented by the following average structural formula; and

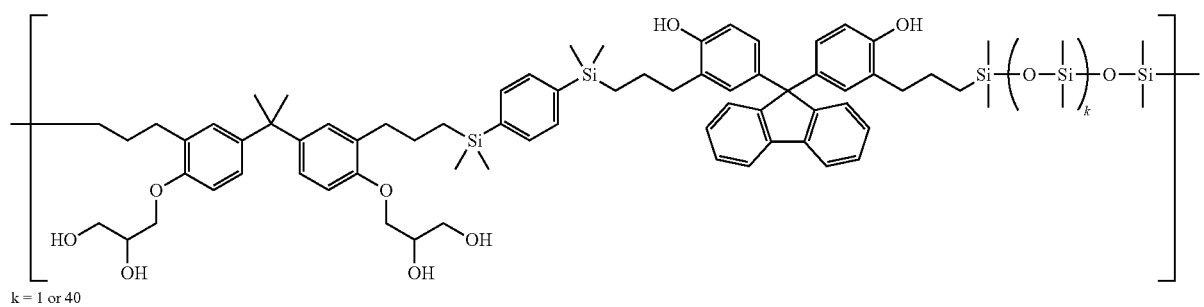

(B-1)

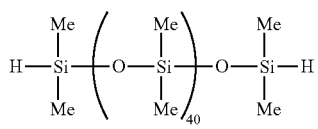

0.6 g of organohydrogensiloxane represented by the following structural formula

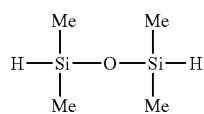

were dropped in the flask for one hour. After the dropping was finished, the reaction solution was aged for 3 hours at 90° C. Subsequently, 110.7 g of 1,4-bis(dimethylsilyl)benzene was dropped in the flask for one hour. After the dropping was finished, the reaction solution was further aged for 6 hours at 90° C. and filtered, and then, 200 g of methyl isobutyl ketone and 800 g of water were added into them. The mixture was separated into layers and the water layer of the under layer was removed. The solvent in the thus obtained solution was removed under reduced pressure, to obtain a resin solid (B-1) shown below. A weight average molecular weight, in terms of polystyrene, of a solution in which the resin solid is dissolved into tetrahydrofuran was 19,000 by measurement of GPC. (B-1) corresponds to the foregoing general formula (1) wherein (c+d)/(a+b+c+d)=0.30.

Synthesis Example 2-2

40.0 g of the resin solid (B-1) synthesized in Synthesis Example 2-1 was dissolved into 134.1 g of tetrahydrofuran, and the solution was poured into a flask equipped with a stirrer, a thermometer, a nitrogen purging line and a reflux condenser. Then, 4.7 g of hexahydrophthalic anhydride, 7.6 g of triethylamine and 0.09 g of N,N-dimethyl-4-amino pyridine were added thereinto, and the mixture was stirred for 10 minutes at room temperature to dissolve them completely. Subsequently, the mixture solution was stirred for 25 hours at 55° C., tetrahydrofuran therein was removed, and then, 200 g of methyl isobutyl ketone and 300 g of water were added to carry out neutralizing washing. Thereafter, the water layer after separation was removed, a solvent in the thus obtained solution was removed under reduced pressure and 100 g of cyclopentanone was added, to obtain a resin solution (B-2) shown below, which has a resin solids concentration of 55% and contains cyclopentanone as a main solvent. A weight average molecular weight, in terms of polystyrene, of the resin solution was 24,000 by measurement of GPC.

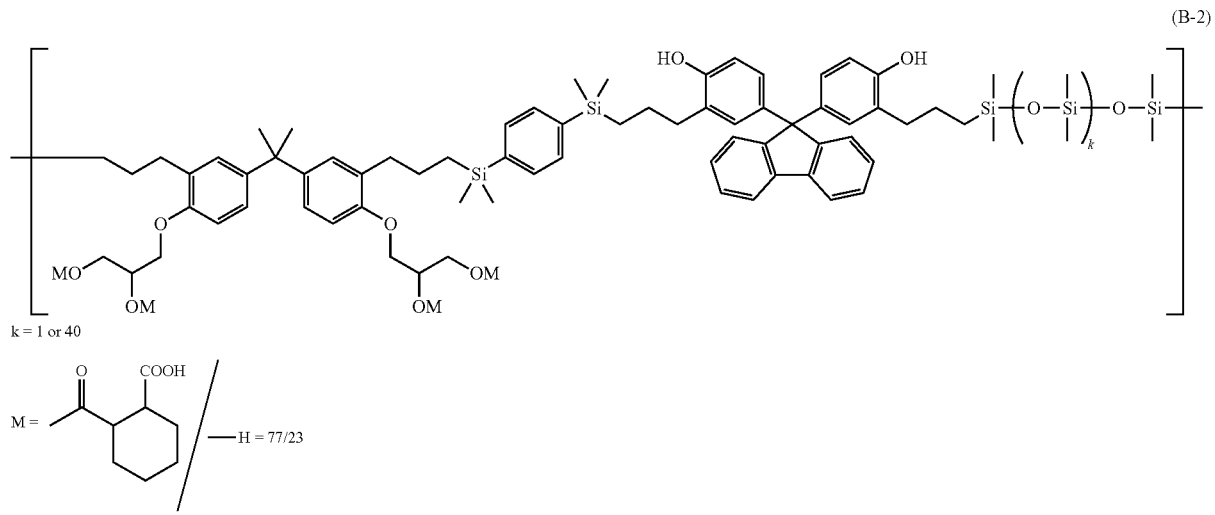

(B-2)

k = 1 or 40

M = [cyclohexane-1,2-dicarbonyl group] / H = 77/23

Referential Examples 1 to 4

Preparation of Composition for Thermosetting Resin

The resin solutions synthesized in Synthesis Examples 1-2 and 2-2 (A-2 and B-2 respectively), a curing agent and a solvent were blended in the ratio shown in Table 1 to prepare a composition for a resin.

Here, in Table 1, H-1 represents bisphenol A diglycidyl, H-2 represents N,N-diglycidyl-4-glycidyloxyaniline and S-1 represents cyclopentanone.

TABLE 1

| | Composition Components (parts by mass) | | | Final Curing Temperature (° C.) |
|---|---|---|---|---|
| | Resin Solution | Curing Agent | Solvent | |
| Referential Example 1 | (A-2) (Polymer-1) (100) | H-1 (5) | S-1 (200) | 180 |
| Referential Example 2 | (A-2) (Polymer 1) (100) | H-2 (5) | S-1 (200) | 180 |
| Referential Example 3 | (B-2) (Polymer-2) (100) | H-1 (5) | S-1 (200) | 180 |
| Referential Example 4 | (B-2) (Polymer-2) (100) | H-2 (5) | S-1 (200) | 180 |

Formation of a Cured Film by Using the Composition and Evaluation of the Film (1) Chemical Resistance Each prepared composition was applied to a plate coated with a fluorocarbon resin in such an amount that a thickness of the composition after dried was about 0.1 mm. The applied film was heated at 80° C. for 30 minutes and then at 180° C. for 1 hour, whereby a cured film of a silicone resin was formed. Each of the cured film was soaked in room temperature N-methyl-2-pyrrolidone (NMP) for 10 minutes. The film was taken out and visually observed whether it swelled or not. The results are as shown in Table 2.

(2) Adhesion Strength

Each prepared composition was applied to a copper substrate and then heated at 80° C. for 30 minutes and then at a final curing temperature shown in Table 1 for 1 hour, whereby a cured film was formed. An adhesion strength after keeping the copper substrate with the cured film thereon in a drier machine at 150° C. for 200 hours (hereinafter referred to as "heat resistance of adhesion"), and an adhesion strength after keeping the copper substrate with the cured film thereon in a saturated water vapor at 120° C. and at 2 atm for 168 hours (hereinafter referred to as "high-temperature and high-humidity resistance of adhesion") were measured by crosscut adhesion test according to the Japanese Industrial Standards (JIS) K5400. The results are as shown in Table 2.

Here, values (numerator/denominator) in Table 2 each indicate a number of patches which were not peeled off (numerator) per 100 patches (denominator). For example, 100/100 indicates that no patch was peeled off and 0/100 indicates all of the 100 patches were peeled off.

TABLE 2

| | NMP resistance | heat resistance of adhesion | high-temperature and high-humidity resistance of adhesion |
|---|---|---|---|
| Referential Example 1 | unchanged | 100/100 | 98/100 |
| Referential Example 2 | unchanged | 100/100 | 100/100 |
| Referential Example 3 | unchanged | 100/100 | 95/100 |
| Referential Example 4 | unchanged | 100/100 | 100/100 |

As shown in Table 2, it is demonstrated that the silphenylene skeleton-containing silicone type polymer of the present invention enables to provide a cured substance (a thermosetting resin) excellent in chemical resistance, heat resistance, and high-temperature and high-humidity resistance of adhesion (heat resistance and humidity resistance).

That is, such a silicone resin of the present invention is useful, for example, as a protective film on electric components and semiconducting material, an interlayer insulating film and an adhesive tape. In particular, it can be suitable to be applied on a substance having relatively low heat resistance or a material easily transubstantiated by heat.

In addition, the method of the present invention enables that the silicone resin of the present invention is manufactured in high yield.

The present invention is not limited to the above embodiments. The above embodiments are merely illustrative, and whatever having the substantially same configurations as the technical concept recited in the appended claims and exhibiting the same functions and effects are embraced within the technical scope of the present invention.

A protective film on electric components and the like are exemplified as a use of the silicone resin of the present invention. However, the use of the silicone resin of the present invention is absolutely not limited to them.

What is claimed is:

1. A silphenylene skeleton-containing silicone type polymer comprising a repeating unit represented by the following general formula (1) and having a weight average molecular weight of 5,000 to 40,000,

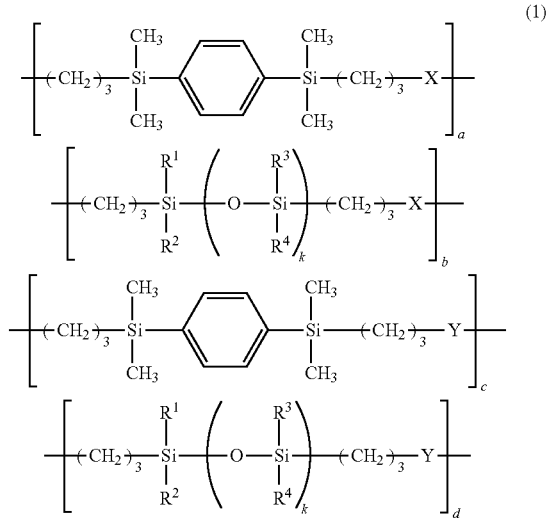

wherein $R^1$ to $R^4$ are each a monovalent hydrocarbon group having 1 to 12 carbon atoms and may be the same or different from each other; k is an integer of 1 to 100; a and b are each 0 or a positive number, and c and d are each a positive number, and they satisfy $0 < (c+d)/(a+b+c+d) \leq 1.0$; X is a divalent organic group represented by the following general formula (2); and Y is a divalent organic group represented by the following general formula (3),

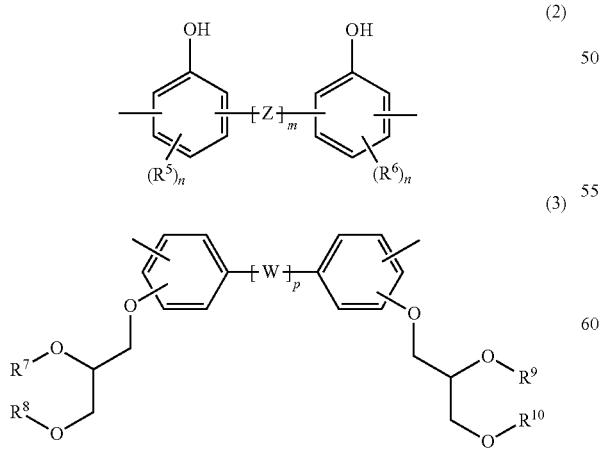

wherein Z and W are each a divalent organic group selected from groups represented by the following formulae;

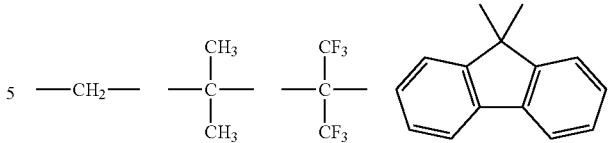

m and p are each 0 or 1; n is 0, 1 or 2; $R^5$ and $R^6$ are each an alkyl or alkoxyl group having 1 to 4 carbon atoms and may be the same or different from each other; and $R^7$ to $R^{10}$ are each a hydrogen atom or a carboxyl-containing organic group and may be the same or different from each other, wherein at least one of $R^7$ to $R^{10}$ is a carboxyl-containing organic group.

2. The silphenylene skeleton-containing silicone type polymer according to claim 1, wherein a content ratio of the carboxyl-containing organic group of $R^7$ to $R^{10}$ of the foregoing general formula (3) is 50% to 100% and a weight average molecular weight is 10,000 to 30,000.

3. The silphenylene skeleton-containing silicone type polymer according to claim 1, wherein at least one of $R^7$ to $R^{10}$ of the foregoing general formula (3) is a group represented by the following formula.

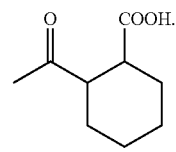

4. The silphenylene skeleton-containing silicone type polymer according to claim 2, wherein at least one of $R^7$ to $R^{10}$ of the foregoing general formula (3) is a group represented by the following formula

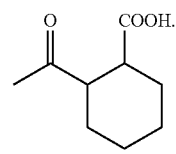

5. A method for manufacturing the silphenylene skeleton-containing silicone type polymer according to claim 1 comprising at least steps of:
preparing a silphenylene skeleton-containing silicone type polymer having an alcoholic hydroxyl group in which $R^7$ to $R^{10}$ of the foregoing general formula (3) are each a hydrogen atom through a polymerization reaction, in the presence of a catalyst, of hydrogensilphenylene represented by the following general formula (4),

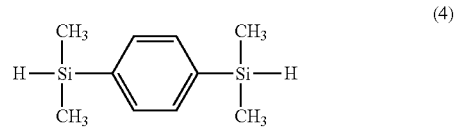

dihydroorganosiloxane represented by the following general formula (5),

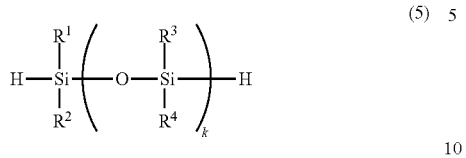
(5)

wherein $R^1$ to $R^4$ and k are the same as above, a diallylphenol compound represented by the following general formula (6),

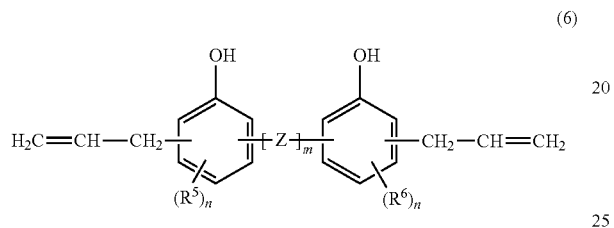
(6)

wherein $R^5$, $R^6$, Z, m and n are the same as above, and a diallylphenol compound represented by the following general formula (7),

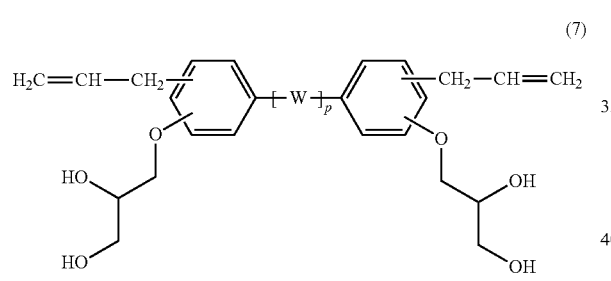
(7)

wherein W and p are the same as above; and substituting at least part of hydrogen atoms of an alcoholic hydroxyl group of the prepared polymer with a carboxyl-containing organic group.

6. A method for manufacturing the silphenylene skeleton-containing silicone type polymer according to claim 2 comprising at least steps of:

preparing a silphenylene skeleton-containing silicone type polymer having an alcoholic hydroxyl group in which $R^7$ to $R^{10}$ of the foregoing general formula (3) are each a hydrogen atom through a polymerization reaction, in the presence of a catalyst, of hydrogensilphenylene represented by the following general formula (4),

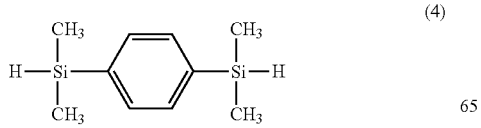
(4)

dihydroorganosiloxane represented by the following general formula (5),

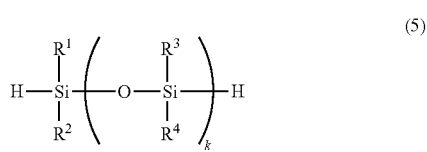
(5)

wherein $R^1$ to $R^4$ and k are the same as above, a diallylphenol compound represented by the following general formula (6),

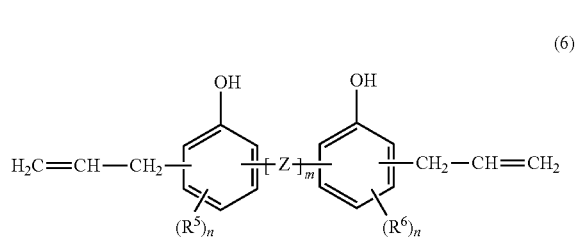
(6)

wherein $R^5$, $R^6$, Z, m and n are the same as above, and a diallylphenol compound represented by the following general formula (7),

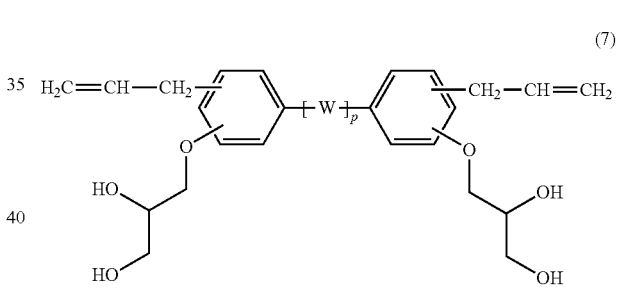
(7)

wherein W and p are the same as above; and substituting at least part of hydrogen atoms of an alcoholic hydroxyl group of the prepared polymer with a carboxyl-containing organic group.

7. A method for manufacturing the silphenylene skeleton-containing silicone type polymer according to claim 3 comprising at least steps of:

preparing a silphenylene skeleton-containing silicone type polymer having an alcoholic hydroxyl group in which $R^7$ to $R^{10}$ of the foregoing general formula (3) are each a hydrogen atom through a polymerization reaction, in the presence of a catalyst, of hydrogensilphenylene represented by the following general formula (4),

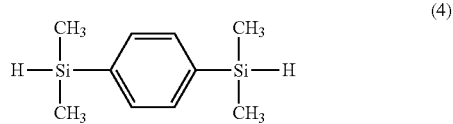
(4)

dihydroorganosiloxane represented by the following general formula (5),

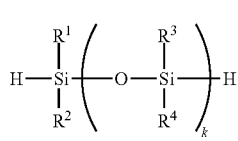

(5)

wherein $R^1$ to $R^4$ and k are the same as above,
a diallylphenol compound represented by the following general formula (6),

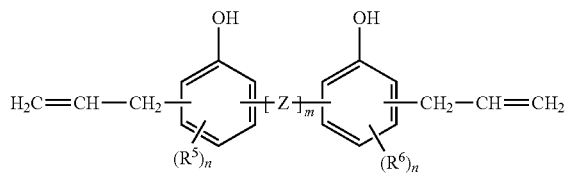

(6)

wherein $R^5$, $R^6$, Z, m and n are the same as above, and a diallylphenol compound represented by the following general formula (7),

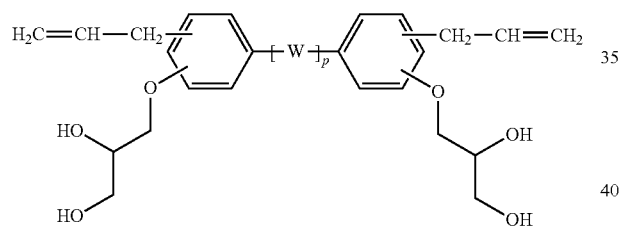

(7)

wherein W and p are the same as above; and
substituting at least one of hydrogen atoms of an alcoholic hydroxyl group of the prepared polymer with a carboxyl-containing organic group.

8. A method for manufacturing the silphenylene skeleton-containing silicone type polymer according to claim 4 comprising at least steps of:
preparing a silphenylene skeleton-containing silicone type polymer having an alcoholic hydroxyl group in which $R^7$ to $R^{10}$ of the foregoing general formula (3) are each a hydrogen atom through a polymerization reaction, in the presence of a catalyst, of hydrogensilphenylene represented by the following general formula (4),

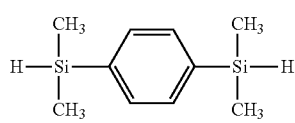

(4)

dihydroorganosiloxane represented by the following general formula (5),

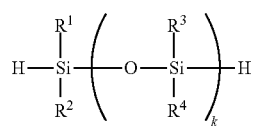

(5)

wherein $R^1$ to $R^4$ and k are the same as above,
a diallylphenol compound represented by the following general formula (6),

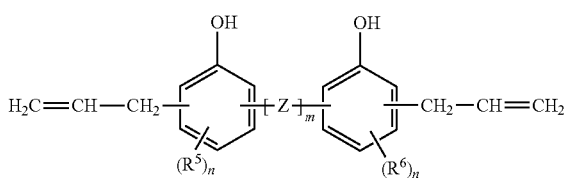

(6)

wherein $R^5$, $R^6$, Z, m and n are the same as above, and a diallylphenol compound represented by the following general formula (7),

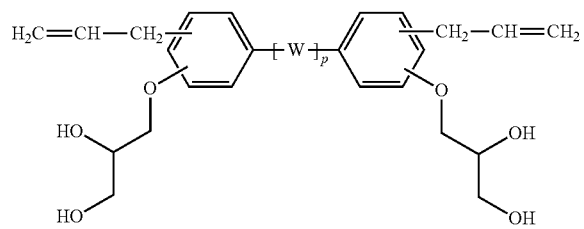

(7)

wherein W and p are the same as above; and
substituting at least one of hydrogen atoms of an alcoholic hydroxyl group of the prepared polymer with a carboxyl-containing organic group.

9. The method for manufacturing the silphenylene skeleton-containing silicone type polymer according to claim 5, wherein the substituting step includes substituting at least one of hydrogen atoms of an alcoholic hydroxyl group of the prepared polymer with a 2-carboxycyclohexylcarbonyl group through a reaction of the prepared polymer with hexahydrophthalic anhydride.

10. The method for manufacturing the silphenylene skeleton-containing silicone type polymer according to claim 6, wherein the substituting step includes substituting at least one of hydrogen atoms of an alcoholic hydroxyl group of the prepared polymer with a 2-carboxycyclohexylcarbonyl group through a reaction of the prepared polymer with hexahydrophthalic anhydride.

11. The method for manufacturing the silphenylene skeleton-containing silicone type polymer according to claim 7, wherein the substituting step includes substituting at least one of hydrogen atoms of an alcoholic hydroxyl group of the prepared polymer with a 2-carboxycyclohexylcarbonyl group through a reaction of the prepared polymer with hexahydrophthalic anhydride.

12. The method for manufacturing the silphenylene skeleton-containing silicone type polymer according to claim 8, wherein the substituting step includes substituting at least one of hydrogen atoms of an alcoholic hydroxyl group of the prepared polymer with a 2-carboxycyclohexylcarbonyl group through a reaction of the prepared polymer with hexahydrophthalic anhydride.

* * * * *